J. E. LEE.
ARMORED PNEUMATIC TIRE.
APPLICATION FILED APR. 10, 1912.
1,086,924.
Patented Feb. 10, 1914.
2 SHEETS—SHEET 1.
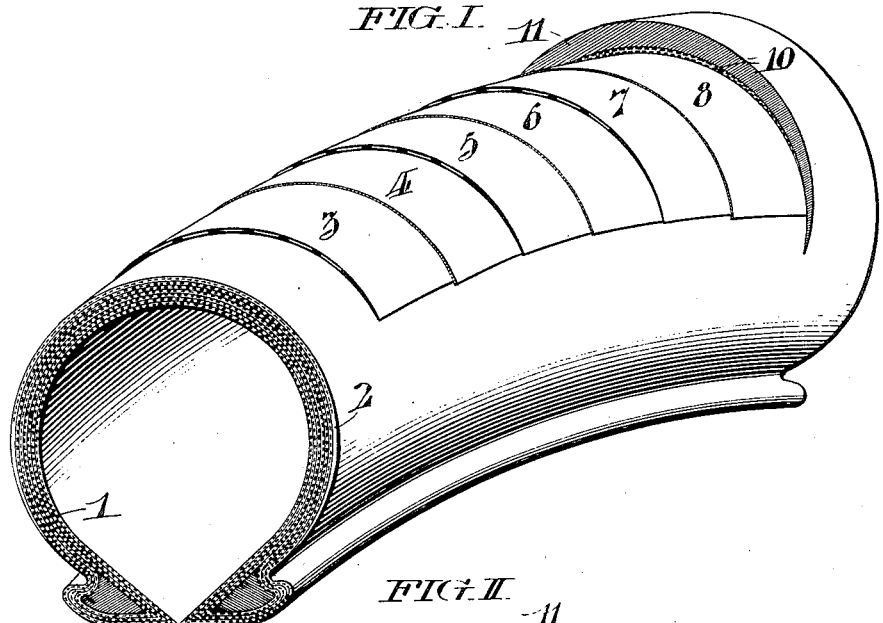
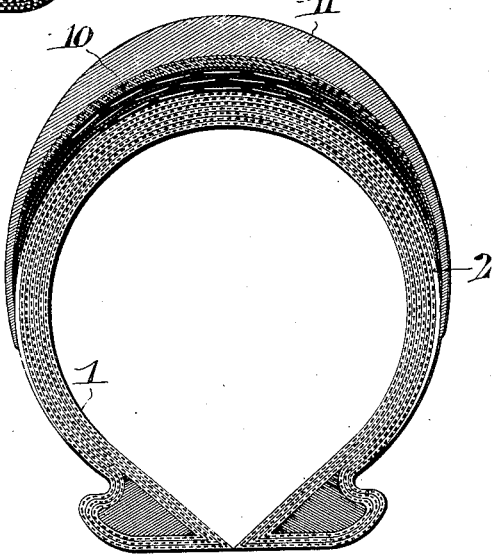
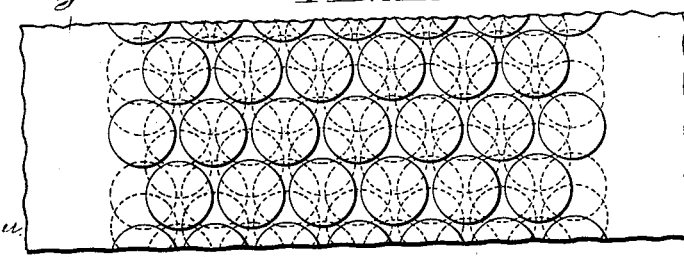
Inventor
John Ellwood Lee,
Witnesses

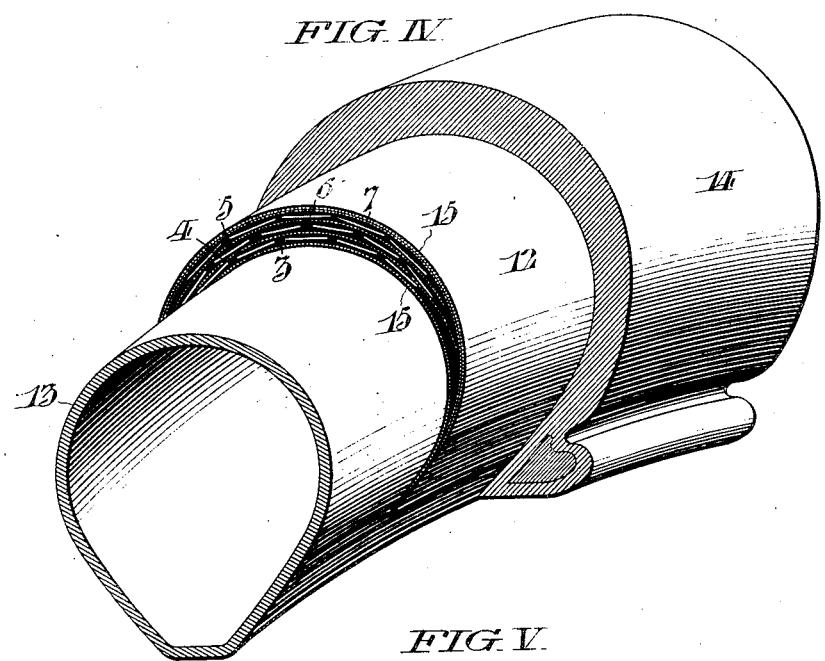
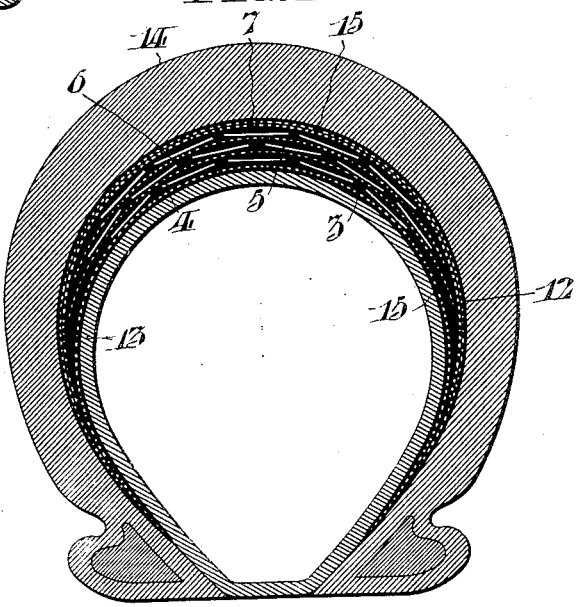

UNITED STATES PATENT OFFICE.

JOHN ELLWOOD LEE, OF CONSHOHOCKEN, PENNSYLVANIA.

ARMORED PNEUMATIC TIRE.

1,086,924.

Specification of Letters Patent. Patented Feb. 10, 1914.

Application filed April 10, 1912. Serial No. 689,709.

*To all whom it may concern:*

Be it known that I, JOHN ELLWOOD LEE, of Conshohocken, in the county of Montgomery and State of Pennsylvania, have invented certain new and useful Improvements in Armored Pneumatic Tires, whereof the following is a specification, reference being had to the accompanying drawings.

Armored tires have been made having interposed between the tread and the inner pneumatic tube, a layer of rubber with small metal disks, arranged in layers, each layer comprising contiguous rows of the disks and the adjacent layers arranged so as to effect an overlapping of the disks of one layer in relation to the disks of the adjacent layer. My invention relates to a tire of this type and has reference to an improvement by which the layers of disks are separated by layers of loosely woven fabric. As heretofore practised in the art, the overlapping layers of metal disks have been embedded in rubber and separated by nothing except rubber, but in use, the disks granulate the rubber and rub against each other. In this way they become displaced in relation to each other and the armored layers are made puncturable. This difficulty I have overcome by my invention which consists in interposing a layer of loosely woven fabric between each layer of disks so as to bind the whole together into a strong body and prevent the disks from becoming displaced.

In the accompanying drawings, I have illustrated a tire embodying my invention in which—

Figure I, is a perspective view of a section of a tire embodying the invention, the separate layers being successively cut away to illustrate the structure. Fig. II, is a sectional view of the same end, Fig. III, is a diagrammatic plan to illustrate the way in which the metal disks overlap. Fig. IV, is a perspective view of a section of a modified form of the tire. Fig. V, is a transverse section of the same.

Referring more particularly to Figs. I, and II, the main carcass 1, of the tire is of standard construction built up of rubber and canvas. On top of the carcass a cushion 2, of rubber may be placed. Above this cushion, a layer of loosely woven fabric, such as canvas, is laid, and upon the canvas is placed an armored strip which consists of a layer of rubber in which metal disks are arranged as clearly shown in the drawings, in a plurality of layers 3, 5, and 7, and the individual plates or disks of the superposed layers are so staggered in relation to each other, that they overlap at their edges to effectually prevent puncture at any point of road traction. One of the peculiarities of the armored strip, is that the metal strips are at all times substantially parallel with the surface of the tire. Said armored strip also includes a plurality of layers of coarse, strong, loosely woven canvas 4, 6, and 8, which layers of canvas are disposed between the layers of rubber in which the plates or disks are embedded. These canvas layers prevent the disks from rubbing against each other, and thus granulating the rubber.

It will be apparent that the invention is not limited to any particular kind of canvas (which term I use as comprehending any more or less loosely woven fabric of the proper strength), nor to any particular shape of disks, the essential features being that the disks shall be so disposed that the disks in adjacent layers overlap, like the overlapping scales of a fish.

Above the armored strip, a breaker strip 10, may be used, and above this strip, the rubber tread 11, is placed and the tread and other parts of the tire are secured together by vulcanization.

While I have described a canvas strip 8, between the breaker strip and the strip of rubber including the outer layer of armored plates, it will be obvious that this layer of canvas may be omitted, if desired.

In Figs. IV, and V, I have shown an armored strip 12, as positioned between the inner tire 13, and the outer cover of tire 14. In this instance, the armored strip is covered at the top and bottom with a layer of heavy tire fabric 15, coated with rubber so that the layers of rubber and layers of canvas forming the strip, are united and held together and also protected against frictional wear between the parts. The shield shown in Figs. IV, and V, may or may not be endless, but I prefer to make the same with overlapping ends where they come together in the tire.

Having thus described my invention, I claim:

1. A vehicle tire including an armored shield or strip having a plurality of layers of rubber with metal plates embedded therein, and a plurality of layers of canvas separating said layers of rubber, said plates in said layers of rubber being so disposed that the plates in one layer overlap at their edges the plates in another layer.

2. A vehicle tire including an armored shield or strip having alternate layers of rubber with separated metal disks embedded therein and of canvas, each rubber layer being so arranged in relation to the adjacent layer of the same character that its metal disk shall overlap the spaces between the disks of the other layer.

In testimony whereof, I have hereunto signed my name at Conshohocken, Pennsylvania, this fifth day of April, 1912.

JOHN ELLWOOD LEE.

Witnesses:
G. H. JONES,
B. M. DRUMMOND.